United States Patent [19]

Ito et al.

[11] Patent Number: 5,548,022
[45] Date of Patent: Aug. 20, 1996

[54] AQUEOUS DISPERSION TYPE STAIN-PROOFING AGENT AND METHOD FOR ITS PRODUCTION

[75] Inventors: Katsuji Ito; Satoshi Kamata, both of Yokohama, Japan

[73] Assignee: Asahi Glass Company Ltd., Tokyo, Japan

[21] Appl. No.: 441,434

[22] Filed: May 15, 1995

[30] Foreign Application Priority Data

May 16, 1994 [JP] Japan .................................. 6-101344
Apr. 26, 1995 [JP] Japan .................................. 7-102734

[51] Int. Cl.$^6$ .......................... C08L 75/04; C08L 33/06
[52] U.S. Cl. .......................... 524/839; 525/454; 525/455; 525/123
[58] Field of Search .......................... 524/839; 525/454, 525/455, 123

[56] References Cited

U.S. PATENT DOCUMENTS

| | | | |
|---|---|---|---|
| 4,340,749 | 7/1982 | Patel | 560/182 |
| 4,401,780 | 8/1983 | Steel | 524/225 |
| 4,468,527 | 8/1984 | Patel | 564/96 |
| 4,504,401 | 3/1985 | Matsuo et al. | 252/8.75 |
| 4,788,287 | 11/1988 | Matsuo et al. | 544/196 |
| 4,792,354 | 12/1988 | Matsuo et al. | 106/2 |
| 5,057,577 | 10/1991 | Matsuo et al. | 525/276 |
| 5,100,954 | 3/1992 | Itoh et al. | 524/805 |
| 5,164,426 | 11/1992 | Shimizu et al. | 525/276 |
| 5,350,795 | 9/1994 | Smith et al. | 525/129 |
| 5,410,073 | 4/1995 | Kirchner | 560/357 |

FOREIGN PATENT DOCUMENTS 0491248  6/1992  European Pat. Off. .
WO93/01349  1/1993  WIPO .

*Primary Examiner*—Thomas Hamilton, III
*Attorney, Agent, or Firm*—Oblon, Spivak, McClelland, Maier, & Neustadt, P.C.

[57] ABSTRACT

An aqueous dispersion type stain-proofing agent comprising an aqueous medium and fine particles containing a reaction product (A) and an addition polymer (B), wherein the reaction product (A) is a reaction product of a compound ($a^1$) having a polyfluoroalkyl group and a group containing active hydrogen reactive with an isocyanate group, with a polyfunctional isocyanate compound ($a^2$).

9 Claims, No Drawings

AQUEOUS DISPERSION TYPE STAIN-PROOFING AGENT AND METHOD FOR ITS PRODUCTION

The present invention relates to a novel aqueous dispersion type stain-proofing agent and a method for its production.

For the purpose of imparting a stain-proofing property to fibers, it is common to treat the fibers with a fluorine-type water and oil repellant. However, in the application to carpets for which high dry soil resistance is required, it has been difficult to obtain adequate dry soil resistance or its durability only by an application of a conventional fluorine-type water and oil repellant. Accordingly, various treating agents made of copolymers or compositions comprising fluorine-containing compounds and other compounds have been proposed as shown by the following examples (1) to (5).

(1) A mixed solution comprising a polymer main agent for imparting water and oil repellency and a polymer for imparting dry soil resistance, (2) a mixture comprising a polymer containing no non-vinyl type fluorine atom and a urethane compound containing a perfluoroalkyl group (Japanese Unexamined Patent Publication No. 128075/1980), (3) a mixture comprising a polymer containing a polyfluoroalkyl group and a water-insoluble ester having a fluorine atom and a chlorine atom (Japanese Unexamined Patent Publication No. 134143/1983), (4) a copolymer of a polymerizable perfluoroalkyl group-containing urethane compound with a monomer for imparting dry soil resistance, and (5) a fiber-treating agent comprising a perfluoroalkyl group-containing urethane compound or a carbodiimide compound.

However, the above treating agents have various problems. For example, the treating solutions (1), (2) and (3) have a problem that no adequate performance can be obtained unless a high concentration is used. The copolymer (4) has a drawback that many steps are required for its synthesis, and the polymerization operation is cumbersome. The fiber-treating agent (5) has a problem that no adequate stain-proofing property can thereby be imparted. There has been no stain-proofing agent which is satisfactory for both of the water and oil repellency and the dry soil resistance. Further, each of such treating agents has a problem that the strength of the coating film is so low that the durability against hard stains such as small stones or mud is poor.

The present invention has been made to solve the above problems and provides an aqueous dispersion type stain-proofing agent comprising an aqueous medium and fine particles containing a reaction product (A) and an addition polymer (B), wherein the reaction product (A) is a reaction product of a compound ($a^1$) having a polyfluoroalkyl group and a group containing active hydrogen reactive with an isocyanate group, with a polyfunctional isocyanate compound ($a^2$).

The present invention also provides a method for producing an aqueous dispersion type stain-proofing agent, which comprises subjecting a polymerizable monomer to addition polymerization in the presence of a reaction product (A) and an aqueous medium, wherein the reaction product (A) is a reaction product of a compound ($a^1$) having a polyfluoroalkyl group and a group containing active hydrogen reactive with an isocyanate group, with a polyfunctional isocyanate compound ($a^2$).

Now, the present invention will be described in detail with reference to the preferred embodiments.

The aqueous dispersion type stain-proofing agent of the present invention contains fine particles containing two types of compounds. One of the two types of compounds is a reaction product (A) of a compound ($a^1$) having both a polyfluoroalkyl group and a group containing active hydrogen reactive with an isocyanate group, with a polyfunctional isocyanate compound ($a^2$). In the following description, a polyfluoroalkyl group will be represented by a "$R_f$" group, and a compound ($a^1$) having both a $R_f$ group and a group containing active hydrogen reactive with an isocyanate group will be represented by a "compound ($a^1$)".

In the present invention, the reaction product (A) is a compound obtained by reacting the compound ($a^1$) with a polyfunctional isocyanate compound ($a^2$). The compound ($a^1$) is preferably a compound having one $R_f$ group and one group containing active hydrogen reactive with an isocyanate group.

The $R_f$ group in the compound ($a^1$) is a group corresponding to an alkyl group in which at least two hydrogen atoms are substituted by fluorine atoms. Such an alkyl group is preferably of a straight chain structure or a branched chain structure. Further, the $R_f$ group may be the one wherein some of carbon atoms may be substituted by ether-type oxygen atoms, or it may contain a carbon-carbon double bond.

The $R_f$ group preferably has from 4 to 20 carbon atoms. Among these carbon atoms, the number of carbon atoms on which one or more fluorine atoms are bonded, is usually at least two, preferably from 4 to 18, more preferably from 6 to 16. Further, the proportion of the number of fluorine atoms in the $R_f$ group is preferably such that (the number of fluorine atoms in the $R_f$ group)/(the total number of hydrogen atoms in a hydrocarbon group having the same carbon number as the $R_f$ group) is at least 60%, particularly preferably at least 80%.

A group having a structure of the $R_f$ group wherein all hydrogen atoms are substituted by fluorine atoms, is referred to as a perfluoro group. The $R_f$ group is preferably a polyfluoroalkyl group, of which the terminal portion is a perfluoroalkyl group. The perfluoroalkyl group preferably has a straight chain structure and particularly preferably is the one represented by the formula $C_mF_{2m+1}$ wherein m is an integer of from 4 to 16, preferably m is an integer of from 6 to 12.

Further, the $R_f$ group may be a group having a hydrogen atom or a chlorine atom at the terminal portion, or a group containing an oxypolyfluoroalkylene moiety. For example, a difluoromethyl group or a chlorodifluoromethyl group may be mentioned. Specific examples of the $R_f$ group will be given blow, but the $R_f$ group is not limited to such specific examples.

$C_4F_9$— including groups of structural isomerism such as $CF_3(CF_2)_3$—, $(CF_3)_2CFCF_2$—, $(CF_3)_3C$— and $CF_3CF_2(CF_3)CF$—; $C_5F_{11}$— such as $CF_3(CF_2)_4$—; $C_6F_{13}$— such as $CF_3(CF_2)_5$—; $C_7F_{15}$— such as $CF_3(CF_2)_6$—; $C_8F_{17}$— such as $CF_3(CF_2)_7$—; $C_9F_{19}$— such as $CF_3(CF_2)_8$—; $C_{10}F_{21}$— such as $CF_3(CF_2)_9$—; and $CHF_2(CF_2)_m$— wherein m is an integer of from 1 to 15.

Further, in the compound ($a^1$), the group containing active hydrogen is a group containing hydrogen reactive with an isocyanate group, and it is preferably a hydroxyl group, an amino group, a carboxyl group or a mercapto group.

In the compound ($a^1$) of the present invention, the $R_f$ group and the group containing active hydrogen may be bonded directly or via a linking group, preferably via a linking group. The linking group has a valency of (a+b) when the number of $R_f$ groups is a and the number of groups having active hydrogen is b. The compound ($a^1$) of the present invention preferably has a structure in which one $R_f$ group is bonded to one group containing active hydrogen via a bivalent linking group.

The compound ($a^1$) having one $R_f$ group and one group containing active hydrogen, is preferably a compound of the following formula (1), wherein $R_f$ represents the above-mentioned polyfluoroalkyl group, preferably a perfluoroalkyl group, at least one fluorine atom is preferably bonded to the carbon atom of $R_f$ which is bonded to Q, Q is a bivalent linking group, and A is the above-mentioned group containing active hydrogen.

$$R_f-Q-A \qquad (1)$$

In the above formula (1), Q is a bivalent linking group such as $-(C=O)-$, $-CONR-$, $-SO_2NR-$, $-SO_2NR(CH_2)_n-$, $-SO_2-$, $-(CH_2)_n-$, $-C_6H_4-$, $-C_6H_3Cl-$ or $-OC_2H_4-$, wherein R is a hydrogen atom or a $C_{1-6}$ lower alkyl group, n is an integer of from 1 to 20, and m is 0 or 1. Among these groups, Q is preferably an alkylene group, or an alkylene group containing a sulfoneamide group. Particularly preferred is $-(CH_2)_p-$, wherein p is an integer of from 1 to 5, or $-SO_2NR(CH_2)_q-$ wherein q is an integer of from 1 to 5, and R is a lower alkyl group. Further, $-(CH_2)_2-$ or $-SO_2NR(CH_2)_2-$ is preferred, wherein R is preferably a methyl group or an ethyl group.

A is preferably a hydroxyl group, an amino group or a carboxyl group, particularly preferably a hydroxyl group.

Specific examples of the compound of the formula (1) will be given below, but it is not limited to such specific examples. In the following formulas, $R_f$ is the above-mentioned polyfluoroalkyl group.

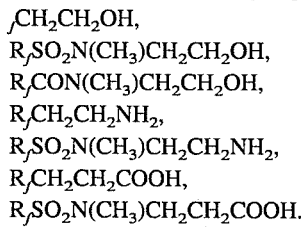

$R_fCH_2CH_2OH$,
$R_fSO_2N(CH_3)CH_2CH_2OH$,
$R_fCON(CH_3)CH_2CH_2OH$,
$R_fCH_2CH_2NH_2$,
$R_fSO_2N(CH_3)CH_2CH_2NH_2$,
$R_fCH_2CH_2COOH$,
$R_fSO_2N(CH_3)CH_2CH_2COOH$.

The reaction product (A) of the present invention is a compound formed by reacting the above compound ($a^1$) with a polyfunctional isocyanate compound ($a^2$). The polyfunctional isocyanate compound ($a^2$) is not particularly limited, and any known or well known polyisocyanate having at least two isocyanate groups or its modified compound may be employed. As the modified compound, a nurate modified compound, a trimethylol modified compound or a biuret modified compound is preferred. As the isocyanate compound, an aliphatic polyfunctional isocyanate, an alicyclic polyfunctional isocyanate or an aromatic polyfunctional isocyanate may, for example, be mentioned. An aliphatic polyfunctional isocyanate or an alicyclic polyfunctional isocyanate is preferred for the reason such that discoloration is less likely to occur after the stain-proofing treatment. Specific examples of the polyfunctional isocyanate compound ($a^2$) will be given below, but it is not limited to such specific examples.

Hexamethylene diisocyanate, isophorone diisocyanate, hydrogenated MDI, trimethylhexamethylene diisocyanate, hydrogenated XDI, xylylene diisocyanate (XDI), tolylene diisocyanate, phenylene diisocyanate, diphenylmethane diisocyanate (MDI) and isocyanurate modified products, trimethylol modified products or trisbiuret modified products thereof. Trifunctional amine derivatives.

Among them, hexamethylene diisocyanate, isophorone diisocyanate, hydrogenated MDI and nurate modified products, trimethylol modified products or biuret modified products thereof are preferred.

The structure of the reaction product (A) of the present invention is preferably a structure of a reaction product of a compound ($a^1$) having one hydroxyl group and a $R_f$ group, with a polyfunctional isocyanate compound ($a^2$). Further, the reaction product (A) preferably has a structure of a compound obtained by reacting together with the compound ($a^1$) another compound ($a^3$) having a group containing active hydrogen and a polyfunctional isocyanate compound ($a^2$).

Such another compound ($a^3$) having a group containing active hydrogen (hereinafter referred to as a compound ($a^3$)), a compound having a hydroxyl group, an amino group or a carboxyl group is preferred. Further, the compound ($a^3$) is preferably a compound containing no $R_f$ group.

As a compound having a hydroxyl group among the compounds ($a^3$), a compound of the formula $R^1OH$ wherein $R^1$ is a $C_{1-22}$ alkyl group, a glycidyl group, an aziridyl group or a halogenated alkyl group, a monohydric alcohol having an ether bond, such as ethylene glycol monoalkyl ether, polyethylene glycol monomethyl ether, polyethylene glycol monoethyl ether or polypropylene glycol monoalkyl ether, ethylene glycol or 2,3-epoxy-1-propanol is, for example, preferred.

As a compound having a carboxyl group among the compounds ($a^3$), a compound of the formula $R^2COOH$ wherein $R^2$ is a $C_{1-22}$ alkyl group, succinic acid, chlorendic acid or adipic acid may, for example, be mentioned. Particularly preferred is stearic acid or succinic acid.

Further, as a compound having an amino group among the compounds ($a^3$), an alkylamine is preferred. Particularly preferred is butylamine, dibutylamine, stearylamine or ethylenediamine. Further, a hydroxyalkylamine may also be included, and hydroxyethylamine may, for example, be mentioned.

When the compound ($a^3$) is employed, it is preferably used in an amount of from 0.1 to 30 parts by weight, per 100 parts by weight of the compound ($a^1$).

The synthesis of the reaction product (A) of the present invention can usually be carried out by heating the compound ($a^1$) and the polyfunctional isocyanate compound ($a^2$) in the presence of a solvent. Further, in a case where the reaction product (A) is a compound having an isocyanate group reacted with the compound ($a^3$), any one of the following methods may be employed:

[a] a method of reacting an excess amount of the polyfunctional isocyanate compound ($a^2$) to the compound ($a^1$), and reacting the compound ($a^3$) to unreacted isocyanated groups;

[b] a method of reacting an excess amount of the polyfunctional isocyanate compound ($a^2$) to the compound ($a^3$) and reacting the compound ($a^1$) to unreacted isocyanate groups.

[c] a method of reacting the polyfunctional isocyanate compound ($a^2$) to the compound ($a^1$) and the compound ($a^3$).

In any one of these methods, as the compound ($a^1$), one or more compounds may be reacted, and when two or more compounds are to be reacted, it is preferred to employ a mixture of two or more compounds differing in the carbon number of $R_f$ groups.

In the above reaction, the ratio of the compound ($a^1$) to the polyfunctional isocyanate compound ($a^2$) is usually such that the compound ($a^1$) is from 30 to 90 equivalent, preferably from 50 to 80 equivalent, per 100 equivalent of the polyfunctional isocyanate compound ($a^2$). When the compound ($a^3$) is reacted, it is preferred to use the compound ($a^3$) in an amount whereby all isocyanate groups of the polyfunctional isocyanate compound ($a^2$) are reacted by the reaction of the compounds ($a^1$) and ($a^3$), or more. The reaction product (A) of the present invention preferably contains no unreacted isocyanate group.

Further, the reaction temperature is usually at a level of from 60° to 110° C. When a compound having a hydroxyl group or an amino group as the active hydrogen-containing group is used, the temperature is preferably from 60° to 90° C. and when a compound having a carboxyl group as the active hydrogen-containing group is used, the temperature is preferably from 90° to 110° C. As the solvent, methyl ethyl ketone, methyl isobutyl ketone, diethyl succinate or butyl acetate is, for example, preferred. In the reaction, a catalyst may be used. The catalyst is preferably a catalyst containing tin or copper. From the viewpoint of availability, dibutyltin dilaurate is preferred. The catalyst is used usually preferably in an amount of from 0.01 to 0.1 equivalent per equivalent of the isocyanate group. The reaction time is usually from about 4 to 8 hours.

The molecular weight of the reaction product (A) is preferably from about 500 to 5,000, more preferably from about 1,000 to 3,000.

These reaction conditions are the same irrespective of the presence or absence of the compound ($a^3$). In the reaction, an organic solvent may be used to such an extent not to hinder the solubility of the formed reaction product (A).

The aqueous dispersion type stain-proofing agent of the present invention is the one containing at least two types of compounds in one fine particle. One of such two types of compounds is the above-mentioned reaction product (A) and another one is the addition polymer (B). The addition polymer (B) is not particularly limited. A known or well known polymer containing polymer units of a polymerizable monomer may be employed. As the polymerizable monomer, an acrylate, a methacrylate, a vinyl compound, a halogenated vinyl compound, an olefin or an unsaturated carboxylic acid ester is preferred. Particularly preferred is an acrylate or a methacrylate. As such a polymerizable monomer, the one containing no $R_f$ group is preferred.

The addition polymer (B) of the present invention is preferably those containing polymer units of the following polymerizable monomers. In the following description, an acrylate and a methacrylate are collectively represented by a (meth)acrylate. For example, an acrylic acid ester and a methacrylic acid ester will be collectively referred to as a (meth)acrylic acid ester.

A perfluoroalkylethyl (meth)acrylate, trimethoxysilylpropyl (meth)acrylate, aziridinyl (meth)acrylate, glycidyl (meth)acrylate, ethylene di(meth)acrylate, a hydroxyalkyl (meth)acrylate, 3-chloro-2-hydroxypropyl(meth)acrylate, benzyl (meth)acrylate, cyclohexyl (meth)acrylate, a mono or di(meth)acrylate of a polyoxypropylenediol, a (meth)acrylate having an organopolycyclohexane residue, N-methylol (meth)acrylamide, diacetone (meth)acrylamide, methylol-modified diacetone (meth)acrylamide, a (meth)acrylamide, and an alkyl (preferably $C_{1-22}$ alkyl) ester of (meth)acrylic acid.

Among the above polymerizable monomers, an ester of (meth)acrylic acid containing no $R_f$ group is preferred for the present invention. Further, preferred as an ester of (meth)acrylic acid is the one which contains a short chain hydrocarbon group, a cyclic structure or an aromatic nuclei in the ester moiety. For example, methyl (meth)acrylate, cyclohexyl (meth)acrylate or benzyl (meth)acrylate is preferred.

Such polymerizable monomers may be employed alone or in combination as two or more of them. It is preferred to employ two or more of them. The polymer obtainable by polymerization of two or more such polymerizable monomers may be a random polymer or a block polymer. From the viewpoint of easy polymerization, a random polymer is preferred.

As a method for producing fine particles containing at least two types of the above-mentioned compounds in the present invention, it is preferred to employ a method of subjecting the polymerizable monomer to addition polymerization in the presence of an aqueous medium and the reaction product (A). Specifically, the following methods [d] and [e] may be mentioned.

[d] A method of polymerizing the polymerizable monomer in an emulsion of the reaction product (A).

In the method [d], the emulsion of the reaction product (A) is preferably the one obtained by emulsifying the reaction product (A) in the presence of water, an emulsifier and an organic solvent. The amount of water in the emulsion is usually from 50 to 800 parts by weight, preferably from 100 to 400 parts by weight, per 100 parts by weight of the reaction product (A). The emulsifier is not particularly limited, and any one of cationic, anionic, amphoteric and nonionic emulsifiers may be employed. The amount of the emulsifier is usually from 1 to 30 parts by weight, preferably from 5 to 20 parts by weight, per 100 parts by weight of the emulsion. The organic solvent may, for example, be the one used for the preparation of the reaction product (A) or the one used for the following swelling operation. Such a solvent may be used as it was once used or as recovered.

The organic solvent is preferably an organic solvent insoluble or hardly soluble in water, such as methyl ethyl ketone, methyl isobutyl ketone, ethyl acetate, butyl acetate, diethyl succinate or a solvent mixture comprising two or more of them. The amount of the organic solvent is not particularly limited, and it is usually from 10 to 150 parts by weight, preferably from 20 to 100 parts by weight, per 100 parts by weight of the reaction product (A).

The polymerization reaction is conducted preferably after swelling the polymerizable monomer with the emulsion of the reaction product (A). As a method for swelling, it is preferred to employ a method wherein the polymerizable monomer is added to an emulsion of the reaction product (A) and stirring the mixture for a predetermined period of time under heating. The temperature during the stirring is usually from 20° to 80° C., preferably from 50° to 60° C., and the time is usually from 30 minutes to 5 hours, preferably from 2 to 4 hours. Further, to facilitate the swelling, it is preferred to let the polymerizable monomer swell in the presence of an organic solvent.

As the organic solvent, it is preferred to employ an organic solvent similar to the above-mentioned organic solvent insoluble in water. The amount of the organic solvent is usually from 10 to 150 parts by weight, preferably from 20 to 100 parts by weight, per 100 parts by weight of the reaction product (A). Further, a water-soluble organic solvent may be incorporated together with an organic solvent insoluble in water, to the water in the polymerization reaction and in the swelling operation. The amount of the water-soluble organic solvent is usually preferably from 0 to 50 parts by weight, per 100 parts by weight of the reaction product (A). Further, the swelled polymerizable monomer is polymerized by an addition of a suitable polymerization initiator to obtain the desired aqueous dispersion.

[e] A method wherein the reaction product (A) and the polymerizable monomer are dissolved in a suitable organic solvent, followed by emulsification and polymerization by an addition of a polymerization initiator.

The organic solvent for the method [e] is preferably an organic solvent similar to the organic solvent insoluble in water as used in the method [d]. The organic solvent may contain a water-soluble organic solvent. The amount of the organic solvent may be the same.

The emulsification is preferably carried out by emulsifying by means of a homogenizer in the presence of water and an emulsifier. The emulsifier is not particularly limited, and any one of cationic, anionic, amphoteric and nonionic emulsifiers may be employed. The amount of the emulsifier is usually from 1 to 30 parts by weight, preferably from 5 to 20 parts by weight, per 100 parts by weight of the emulsion. The organic solvent is distilled off under reduced pressure after the polymerization to obtain an aqueous dispersion.

The aqueous dispersion obtained by the above method may be adjusted to a desired concentration depending upon the purpose and the application to obtain an aqueous dispersion type stain-proofing agent of the present invention.

The polymerization initiator is not particularly limited in either the method [d] or [e]. A known polymerization initiator may be employed. For example, an organic peroxide, an azo compound or a persulfate as well as a radiation such as y-rays, may be mentioned. When the polymerization reaction system contains a water-insoluble organic solvent, it is preferred to employ a lipophilic polymerization initiator.

The proportions of the reaction product (A) and the addition polymer (B) in the fine particles are not particularly limited. In a usual case, the addition polymer (B) is from 0.01 to 99 parts by weight, preferably from 0.3 to 9 parts by weight, more preferably from 1.5 to 3 parts by weight, per part by weight of the reaction product (A). Further, the fine particles may contain a compound other than the reaction product (A) and the addition polymer (B).

The average particle size of the particles are not particularly limited. In a usual case, it is from 0.05 to 2.0 μm, preferably from 0.2 to 1.5 μm.

The stain-proofing agent of the present invention comprises at least above-mentioned two types of compounds i.e. the reaction product (A) and the addition polymer (B). The structure of such fine particles may, for example, be a structure in which the reaction product (A) and the addition polymer (B) are entangled to each other, a structure wherein the reaction product (A) is present inside and the addition polymer (B) is present outside, or the addition polymer (B) is present inside and the reaction product (A) is present outside. Particularly preferred is a structure in which the reaction product (A) is present inside, and the addition polymer (B) is present outside.

Further, the stain-proofing agent of the present invention may contain the reaction product (A) and/or the addition polymer (B) together with said fine particles.

The stain-proofing agent of the present invention is an aqueous dispersion type stain-proofing agent wherein the above-mentioned fine particles are dispersed in an aqueous medium. The aqueous medium may be water or a medium containing a mixture comprising water and a water-soluble organic solvent. It is preferably water which contains no organic solvent. When the aqueous medium contains a water-soluble organic solvent, a glycol is preferred as such an organic solvent. Specifically, propylene glycol, propylene glycol monomethyl ether, propylene glycol monoethyl ether, dipropylene glycol, dipropylene glycol monomethyl ether or dipropylene glycol monoethyl ether may, for example, be mentioned. The water-soluble organic solvent may be the one which is used for polymerization or may be the one which is subsequently added. The amount of the water-soluble organic solvent is preferably from 0.001 to 10 parts by weight, per 100 parts by weight of the stain-proofing agent and per part by weight of water.

The aqueous dispersion type stain-proofing agent of the present invention may contain components other than as described above. For example, it may contain other water repellents or oil repellents, or an additive such as a crosslinking agent, an insecticide, an flame retardant, an antistatic agent, a dye-stabilizer or a crease-preventing agent.

The concentration of the aqueous dispersion type stain-proofing agent of the present invention may suitably be changed depending upon the article to be treated or the type of formulation. However, in a usual case, it is preferably adjusted to a concentration such that the amount of fluorine will be from 10 to 1,000 ppm, per part by weight of the article to be treated. As a treating method with the aqueous dispersion type stain-proofing agent of the present invention, any optional method may be employed depending upon the type of the article to be treated or the type of formulation. For example, a method may be employed in which the agent is applied to the surface of an article to be treated by a conventional method for coating such as a dip coating method, followed by drying. If necessary, curing may be applied. Further, it is possible to apply spraying or treatment at a spinning stage. Further, the article treated with the aqueous dispersion type stain-proofing agent of the present invention is preferably subjected to heat treatment after the coating treatment. The heat treatment is preferably carried out at a temperature of from 80° to 150° C. for from 5 to 30 minutes.

The articles to be treated by the aqueous dispersion type stain-proofing agent of the present invention are not particularly limited, and various examples may be mentioned. For example, they include fiber woven fabrics, fiber knitted fabrics, glass, paper, wood, leather, wool, asbestos, bricks, cement, metal, metal oxides, ceramics and plastics. Examples for fibers and fiber fabrics include animal and plant natural fibers such as cotton, hemp, wool and silk, synthetic fibers such as polyamide, polyester, polyvinyl alcohol, polyacrylonitrile, polyvinyl chloride and polypropylene, semisynthetic fibers such as rayon and acetate, inorganic fibers such as glass fibers, carbon fibers and asbestos fibers, and woven fabrics and knitted fabrics of mixed fibers thereof. As the articles to be treated by the aqueous dispersion type stain-proofing agent of the present invention, carpets and curtains are preferred.

Now, the present invention will be described in further detail with reference to Examples and Comparative Examples. However, it should be understood that the present invention is by no means restricted to such specific Examples.

The water repellency and the oil repellency were evaluated by the following methods.

Namely, to evaluate the water repellency, liquid droplets (diameter: about 4 mm) of 2-propanol aqueous solution kits having different concentrations were gently placed on a treated cloth, whereby the water repellency was represented by the highest kit number (see the following Table 1) where no wetting took place for 3 minutes. The larger the kit number, the better in the water repellency.

To evaluate the oil repellency, a few drops (diameter: about 4 mm) of a test solution as identified in Table 2 were placed at two locations on a test cloth, and the oil repellency was evaluated by the impregnation state after 30 seconds (AATCC-TM118-1966). The symbol +(−) attached to the water repellency number and the oil repellency number indicates that the respective properties are slightly good (poor).

The dry soil resistance was evaluated by means of a rotary stamping tester simulating human walking using a carpet and a Nujol-containing mud soil (manufactured by 3M). The carpet was cleaned once a day by a vacuum cleaner, and after the test corresponding to 3 months of actual walking, the color of the carpet was measured by a color difference meter. The stain-proofing property was evaluated by the color difference from a non-soiled cloth. The smaller the numerical value of the color difference, the better the stain-proofing property

TABLE 1

| Kit number | water | 2-Propanol |
|---|---|---|
| 1 | 100 | 0 |
| 2 | 90 | 10 |
| 3 | 80 | 20 |
| 4 | 70 | 30 |
| 5 | 60 | 40 |
| 6 | 50 | 50 |
| 7 | 40 | 60 |
| 8 | 30 | 70 |
| 9 | 20 | 80 |

TABLE 2

| Oil repellency number | Test solution | Surface tension dyn/cm · 25° C. |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixed solution of n-hexadecane/Nujol = 35/65 (weight ratio) | — |
| 1 | Nujol | 31.2 |
| 0 | Where the oil repellency number is less than 1. | — |

PREPARATION EXAMPLE 1

Into a 2 l glass reactor equipped with a thermometer, a dropping funnel, a stirrer and a Dimroth condenser, 320 g of diethyl succinate and 400 g of hexamethylene diisocyanate trisbiuret (NCO%=23%) were charged, followed by nitrogen purging. Then, the temperature was raised to 70° C., and 0.1 g of dibutyltin dilaurate was added as a catalyst thereto. Then, sequentially dropwise added thereto from the dropping funnel were 74 g of stearyl alcohol for 2 hours, 31 g of 2,3-epoxy-1-propanol for one hour and 765 g of $C_nF_{2n+1}CH_2CH_2OH$ (wherein n is a mixture of from 6 to 16, the average being 9) for 3 hours. Stirring was continued for further 30 minutes, whereupon the crude reaction solution was analyzed by infrared spectrometry to confirm that absorption by isocyanate disappeared.

PREPARATION EXAMPLE 2

Into a 2 l glass reactor equipped with a thermometer, a dropping funnel, a stirrer and a Dimroth condenser, 320 g of methyl isobutyl ketone (hereinafter referred to as MIBK) and 400 g of isophorone diisocyanate trimer (NCO% =19%) were charged, followed by nitrogen purging. Then, the temperature was raised to 70° C., and 0.1 g of dibutyltin dilaurate was added as a catalyst thereto. Then, sequentially dropwise added thereto from the dropping funnel were 16 g of methanol for 2 hours and 692 g of $C_nF_{2n+1}CH_2CH_2OH$ (wherein n is a mixture of from 6 to 16, the average being 9) for 3 hours. Stirring was continued for further 30 minutes, whereupon the reaction product was analyzed by infrared spectrometry to confirm that absorption by isocyanate disappeared.

PREPARATION EXAMPLE 3

Into a 2 l glass reactor equipped with a thermometer, a dropping funnel, a stirrer and a Dimroth condenser, 320 g of MIBK and 400 g of isophorone diisocyanate trimethylolpropane-modified product (NCO%=11%) were charged, followed by nitrogen purging. Then, the temperature was raised to 70° C. and 0.1 g of dibutyltin dilaurate was added thereto. Then, sequentially dropwise added thereto from the dropping funnel were 85.3 g of behenyl alcohol for 2 hours and 400 g of $C_nF_{2n+1}CH_2CH_2OH$ (wherein n is a mixture of from 6 to 16, the average being 9) for 3 hours. Stirring was continued for further 30 minutes, whereupon the reaction product was analyzed by infrared spectrometry to confirm that absorption by isocyanate disappeared.

PREPARATION EXAMPLE 4

To 100 g of the compound prepared in Preparation Example 1, 20 g of diethyl succinate, 190 g of water, 8 g of a nonionic emulsifier (Emulgen 920, manufactured by Kao Corporation) and 2.4 g of a cationic emulsifier (acetate of Farmin DMC, manufactured by Kao Corporation) were added, and the mixture was heated to 85° C. The mixture was stirred by a homomixer at 3,000 rpm for 5 minutes and then emulsified by a high pressure homogenizer to obtain an emulsion having an average particle size of 0.3 μm. The solid content concentration was adjusted to 20% with water.

PREPARATION EXAMPLE 5

Using the compound obtained in Preparation Example 2, emulsification was carried out in the same manner as in Preparation Example 4 to obtain an emulsion having an average particle size of 0.4 μm.

PREPARATION EXAMPLE 6

Using the compound obtained in Preparation Example 2, emulsification was carried out in the same manner as in Preparation Example 4. After the emulsification, MIBK was distilled off under reduced pressure at 65° C. to obtain a stable emulsion having an average particle size of 0.2 μm containing no solvent.

EXAMPLE 1

Into a 200 ml reactor equipped with a stirrer, 100 g of the emulsion obtained in Preparation Example 4 was charged, and 20 g of methyl methacrylate (hereinafter referred to as MMA) as a polymerizable monomer and 13 g of water were added. The mixture was stirred at 60° C. for 2 hours. Stirring was stopped after the 2 hours, and the product was inspected, whereby MMA was completely absorbed by the emulsion. The temperature was lowered to 40° C. Then, 0.1 g of azobisisobutyronitrile (V-60, manufactured by Wako Junyaku K.K.) was added as a polymerization initiator thereto. The mixture was reacted at 60° C. for 20 hours. After the 20 hours, the conversion of MMA to the addition polymer was 99%. The product was cooled to room temperature to obtain a stable emulsion.

Using a cut carpet made of nylon-6,6 as a test cloth, the obtained emulsion was used for evaluation. The test cloth was dip-treated so that the deposition amount would be 400 ppm as the amount of fluorine, then dried at 130° C. for 10 minutes and left to stand for 24 hours, followed by evaluation. The evaluation results of the water repellency, the oil repellency and the color difference are shown in Table 4.

EXAMPLES 2 to 8

Using 100 g of the emulsion obtained in Preparation Example 4 and a polymerizable monomer as identified in Table 3 instead of MMA in Example 1, the reaction was carried out in the same manner as in Example 1 to obtain a stable emulsion. The conversion of the polymerizable monomer to the addition polymer was at least 99% in each case. Using the emulsion thus obtained, evaluation was carried out in the same manner as in Example 1, and the results are shown in Table 4.

TABLE 3

| Example No. | Polymerizable monomer | Amount (g) |
| --- | --- | --- |
| 2 | MMA | 10 |
| 3 | MMA | 60 |
| 4 | Cyclohexyl methacrylate | 20 |
| 5 | n-Butyl methacrylate | 20 |
| 6 | Benzyl methacrylate | 20 |
| 7 | MMA/Glycidyl methacrylate | 9/1 |
| 8 | MMA/Glycidyl methacrylate | 27/3 |

EXAMPLE 9

Using 100 g of the emulsion obtained in Preparation Example 5 and 20 g of MMA as a polymerizable monomer, the reaction was carried out in the same manner as in Example 1 to obtain a stable emulsion. The conversion of MMA to the addition polymer was at least 99%. Using the emulsion thereby obtained, evaluation was carried out in the same manner as in Example 1, and the results are shown in Table 4.

EXAMPLE 10

Using 100 g of the emulsion obtained in Preparation Example 6 and 20 g of MMA as a polymerizable monomer, the reaction was carried out in the same manner as in Example 1 to obtain a stable emulsion. The conversion of MMA was at least 99%. Using the emulsion thereby obtained, evaluation was carried out in the same manner as in Example 1, and the results are shown in Table 4.

EXAMPLE 11

To 100 g of the compound obtained in Preparation Example 1, 80 g of MMA and 50 g of MIBK were added and dissolved at 70° C. to obtain a solution. Then, 8 g of a nonionic emulsifier (Emulgen 920, manufactured by Kao Corporation) and 2.4 g of a cationic emulsifier (acetate of Farmin DMC, manufactured by Kao Corporation were added thereto, and the mixture was heated to 85° C. Then, the mixture was stirred by a homomixer at 3,000 rpm for 5 minutes and then emulsified by a high pressure homogenizer to obtain an emulsion having an average particle size of 0.4 µm. Then, 0.1 g of azobisisobutyronitrile (V-60, manufactured by Wako Junyaku K.K.) was added as a polymerization initiator thereto, and the mixture was reacted at 60° C. for 20 hours. The conversion of MMA was 98%. MIBK and unreacted monomers were distilled off under reduced pressure to obtain a stable emulsion containing no solvent. Using the emulsion thereby obtained, evaluation was carried out in the same manner as in Example 1, and the results are shown in Table 4.

COMPARATIVE EXAMPLE 1

Using the emulsion obtained in Preparation Example 4, evaluation was carried out in the same manner as in Example 1. The results are shown in Table 4.

COMPARATIVE EXAMPLE 2

Using a mixture comprising 100 g of the emulsion obtained in Preparation Example 4 and 20 g of a polymer of MMA, evaluation was carried out in the same manner as in Example 1. The results are shown in Table 4.

COMPARATIVE EXAMPLE 3

99 wt % of a (perfluoroalkylethyl)acrylate $C_nF_{2n+1}C_2H_4OHCOCH=CH_2$ (wherein n is a mixture of from 6 to 16, the average of n being 9), 1 wt % of n-dodecylmercaptan, 4 wt % of (polyoxyethylene) (nonylphenol)ether (20 mols of ethyleneoxide added), 60 wt % of acetone, 140 wt % of water and 2 wt % of azobisisobutyronitrile were mixed and heated to 35° C. with stirring. Then, this mixture was emulsified by a high pressure homogenizer and then put into a 1 l autoclave equipped with a stirrer. Then, the internal air was replaced by nitrogen gas. Then, stirring was carried out at 70° C. for 5 hours to obtain an emulsion having an average particle size of 0.1 µm. The solid content concentration was adjusted to 20% with water.

Using 100 g of the emulsion thereby obtained and 2 g of the same (perfluoroalkylethyl)acrylate as above and 18 g of n-butyl methacrylate, as polymerizable monomers, polymerization was carried out in the same manner as in Example 1. Upon expiration of 20 hours, the conversion of the (perfluoroalkylethyl)acrylate and the n-butyl methacrylate to the polymer was at least 99%. The product was cooled to room temperature to obtain a stable emulsion. Using the emulsion thereby obtained, evaluation was carried out in the same manner as in Example 1, and the results are shown in Table 4.

COMPARATIVE EXAMPLE 4

Into a 2 l glass reactor equipped with a thermometer, a dropping funnel, a stirrer and a Dimroth condenser, 320 g of MIBK and 174 g of tolylene diisocyanate were charged, followed by nitrogen purging. Then, the temperature was raised to 50° C. with stirring, and 510 g of $C_nF_{2n+1}CH_2CH_2OH$ (wherein n is a mixture of from 6 to 16, the average of n being 9) melted at 70° C., was dropwise added thereto from the dropping funnel over a period of 2 hours. Then, 130 g of 2-hydroxyethyl methacrylate was dropwise added thereto over a period of one hour. Stirring was continued for further 30 minutes, whereupon the crude reaction solution was analyzed by infrared spectrometry to confirm disappearance of absorption by isocyanate and formation of the compound (2).

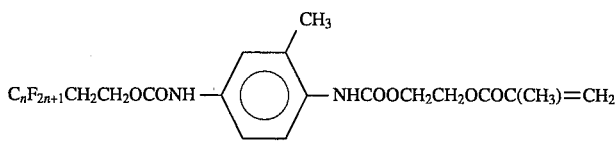

(2)

100 g of the crude reaction solution containing 67 wt % as the solid content concentration of the compound (2) and 111 g of MIBK were mixed and heated to 70° C. to obtain a solution. To this solution, 300 g of water, 8 g of a nonionic emulsifier (Emulgen 920, manufactured by Kao Corporation) and 2.4 g of a cationic emulsifier (acetate of Farmin DMC, manufactured by Kao Corporation) were added, and the mixture was heated to 70° C. The mixture was stirred by a homomixer at 3,000 rpm for 5 minutes and then emulsified by a high pressure homogenizer.

600 g of the emulsified product was cooled to 30° C. and put into a 1 l autoclave equipped with a stirrer. Then, 2 wt % of azobisisobutyronitrile was mixed as a polymerization initiator thereto. The internal air was substituted by nitrogen gas, and stirring was carried out at 70° C. for 5 hours, whereupon the conversion of MMA was at least 99%, as measured by gas chromatography. MIBK was distilled off under reduced pressure to obtain a stable emulsion having an average particle size of 0.1 μm containing no solvent. Using the emulsion thus obtained, evaluation was carried out in the same manner as in Example 1, and the results are shown in Table 4.

REFERENCE EXAMPLE 1

The same evaluation was carried out with respect to a test cloth as used in Example 1 without applying any treatment. The results are shown in Table 4.

TABLE 4

|  | Water repellency | Oil repellency | Color difference |
| --- | --- | --- | --- |
| Ex. 1 | 4 | 5 | 10 |
| Ex. 2 | 4 | 5 | 13 |
| Ex. 3 | 4 | 5 | 13 |
| Ex. 4 | 4 | 5 | 10 |
| Ex. 5 | 4 | 5 | 11 |
| Ex. 6 | 4 | 5 | 10 |
| Ex. 7 | 4 | 5 | 12 |
| Ex. 8 | 4 | 5 | 10 |
| Ex. 9 | 3 | 4 | 12 |
| Ex. 10 | 3 | 4 | 13 |
| Ex. 11 | 3 | 4 | 11 |
| Comp. Ex. 1 | 3 | 4 | 15 |
| Comp. Ex. 2 | 2 | 1 | 17 |
| Comp. Ex. 3 | 7 | 5 | 19 |
| Comp. Ex. 4 | 5 | 3 | 16 |
| Ref. Ex. | 0 | 0 | 20 |

REFERENCE EXAMPLE 2

A polymer particle contained in the emulsion obtained in Example 1 was cut by means of a cryomicrotome, and the cross section of the particle was inspected by means of a transmission electron microscope. The particle was composed of two portions having different contrasts i.e. a core portion and a shell portion. The core portion was observed to have a thin color and the shell portion was observed to have a dark color. This indicates that the particle is formed of two substances of different constituents.

Cryomicrotome: Ultraomicrotome EM-Super Nova attached cryo apparatus LKB 2288050 Gryo Nova, manufactured by Reichert-Jung.

Transmission electron microscope: JEM-100cx, manufactured by Nippon Denshi K.K.

The aqueous dispersion type stain-proofing agent of the present invention is an excellent stain-proofing agent capable of performing both high dry soil resistance and high water and oil repellency. Further, it is a treating agent excellent also in the durability of such properties. Further, it is an aqueous dispersion type, whereby it is easy to handle and advantageous also from the viewpoint of the environmental protection.

Further, the aqueous dispersion type stain-proofing agent of the present invention forms a coating film having a high glass transition temperature, whereby even when stones or mud is in contact, the damage of the coating film may be minimum. Accordingly, when it is used as a stain-proofing agent for carpets or curtains which are repeatedly susceptible to physical forces, it is capable of performing stain-proofing properties over a long period of time. Further, it is a coating film formed by particles containing two compounds having different properties in the respective particles, and there is a merit that it is possible to obtain a coating film having a proper uniformity than a coating film formed by a composition obtained by merely mixing two compounds.

What is claimed is:

1. An aqueous dispersion type stain-proofing agent comprising an aqueous medium and fine particles containing a reaction product (A) and an addition polymer (B), wherein the reaction product (A) is a reaction product of a compound ($a^1$) having a polyfluoroalkyl group and a group containing active hydrogen reactive with an isocyanate group wherein the compound ($a^1$) is a compound of formula (1)

$$R_f—Q—A \qquad (1)$$

wherein Q is a bivalent linking group selected from the group consisting of —(C=O)—, —CONR—, —SO$_2$NR—, —SO$_2$NR(CH$_2$)$_n$—, —SO$_2$—, —(CH$_2$)$_n$—, —C$_6$H$_4$—, —C$_6$H$_3$Cl— and —OC$_2$H$_4$—, wherein R is a hydrogen atom or a C$_{1-6}$ lower alkyl group, n is an integer of from 1 to 20, and m is 0 or 1, wherein A is a hydroxyl group, an amino group or a carboxyl group, and R$_f$ is a linear or branched C$_4$–C$_{20}$ alkyl group wherein at least two hydrogen atoms of the alkyl are replaced by fluorine, and R$_f$ optionally has one or more ether oxygen linkages, in the alkyl group or a carbon-carbon double bond or both, with a polyfunctional isocyanate compound ($a^2$) selected from the group consisting of hexamethylene diisocyanate, isophorone diisocyanate, hydrogenated MDI, trimethylhexamethylene diisocyanate, hydrogenated XDI, xylylene diisocyanate (XDI), tolylene diisocyanate, phenylene diisocyanate, diphenylmethane diisocyanate (MDI) and isocyanurates, trimethylol modified products, trisbiuret modified products, and trifunctional amine derivatives thereof.

2. The aqueous dispersion type stain-proofing agent according to claim 1, wherein the molecular weight of the reaction product (A) is from 500 to 5,000.

3. The aqueous dispersion type stain-proofing agent according to claim 1 or 2, wherein the reaction product (A) is a compound containing no isocyanate group.

4. The aqueous dispersion type stain-proofing agent according to claim 1 or 2, wherein the addition polymer (B) is a polymer containing no polyfluoroalkyl group.

5. The aqueous dispersion type stain-proofing agent according to claim 4, wherein the addition polymer (B) is a polymer containing acrylate and/or methacrylate polymer units.

6. The aqueous dispersion type stain-proofing agent according to claim 1 or 2, wherein the polyfunctional isocyanate compound is a polyfunctional aliphatic isocyanate compound.

7. The aqueous dispersion type stain-proofing agent according to claim 1 or 2, wherein the average particle size of the fine particles is from 0.05 to 2.0 μm.

8. The aqueous dispersion type stain-proofing agent according to claim 1 or 2, wherein the fine particles are of the type wherein the reaction product (A) is present inside the fine particles, and the addition polymer (B) is present outside the fine particles.

9. A method for producing an aqueous dispersion type stain-proofing agent, which comprises subjecting a polymerizable monomer to addition polymerization in the presence of a reaction product (A) and an aqueous medium, wherein the reaction product (A) is a reaction product of a compound ($a^1$) having a polyfluoroalkyl group and a group containing active hydrogen reactive with an isocyanate group, wherein the compound ($a^1$) is a compound of formula (1)

$$R_f\text{—}Q\text{—}A \qquad (1)$$

wherein Q is a bivalent linking group selected from the group consisting of —(C=O)—, —CONR—, —$SO_2$NR—, —$SO_2$NR$(CH_2)_n$—, —$SO_2$—, —$(CH_2)_n$—, —$C_6H_4$—, —$C_6H_3$Cl— and —$OC_2H_4$—, wherein R is a hydrogen atom or a $C_{1-6}$ lower alkyl group, n is an integer of from 1 to 20, and m is 0 or 1, wherein A is a hydroxyl group, an amino group or a carboxyl group, and $R_f$ is a linear or branched $C_4$-$C_{20}$ alkyl group wherein at least two hydrogen atoms of the alkyl are replaced by fluorine, and $R_f$ optionally has one or more ether oxygen linkages, in the alkyl group or a carbon-carbon double bond or both, with a polyfunctional isocyanate compound ($a^2$) selected from the group consisting of hexamethylene diisocyanate, isophorone diisocyanate, hydrogenated MDI, trimethylhexamethylene diisocyanate, hydrogenated XDI, xylylene diisocyanate (XDI), tolylene diisocyanate, phenylene diisocyanate, diphenylmethane diisocyanate (MDI) and isocyanurates, trimethylol modified products, trisbiuret modified products, and trifunctional amine derivatives thereof.

\* \* \* \* \*